Patented May 24, 1932

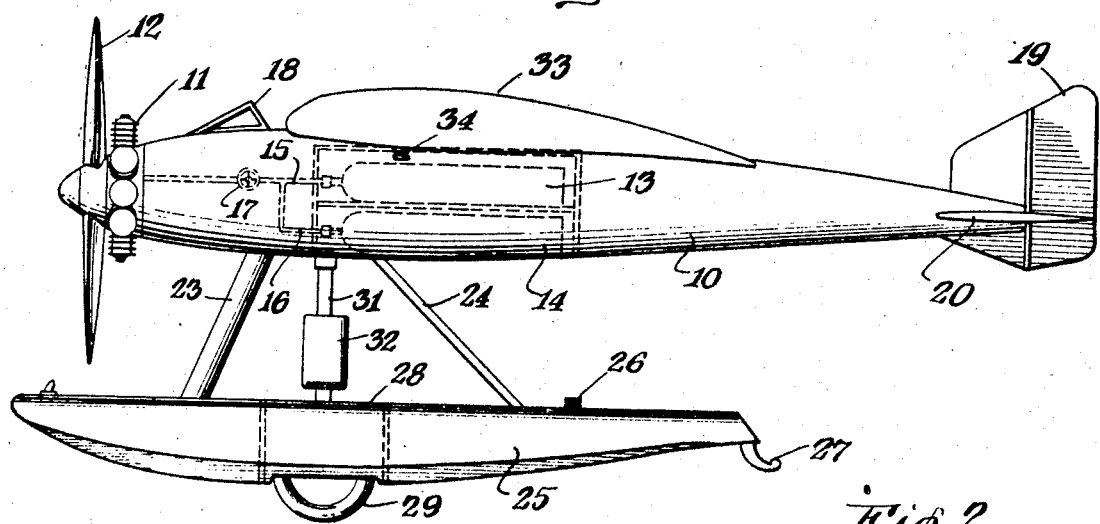
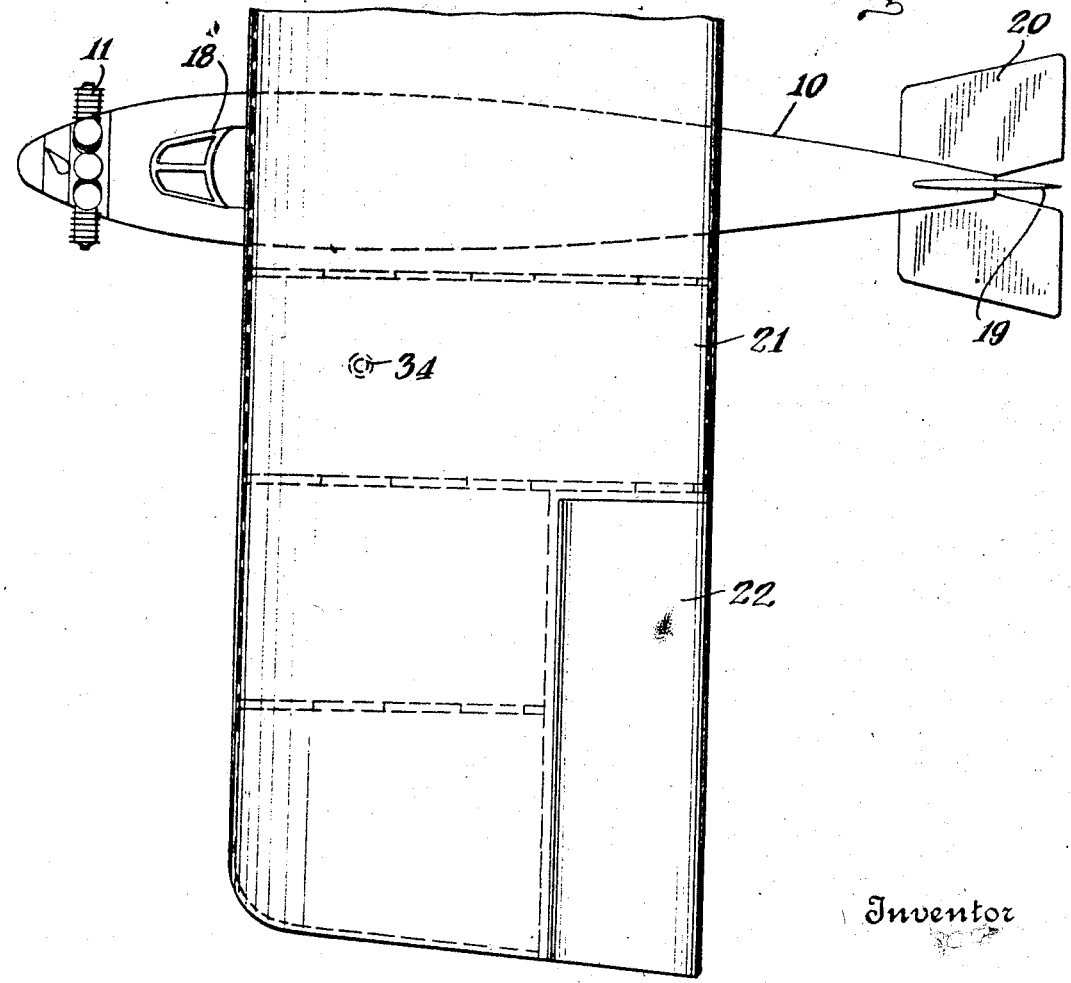

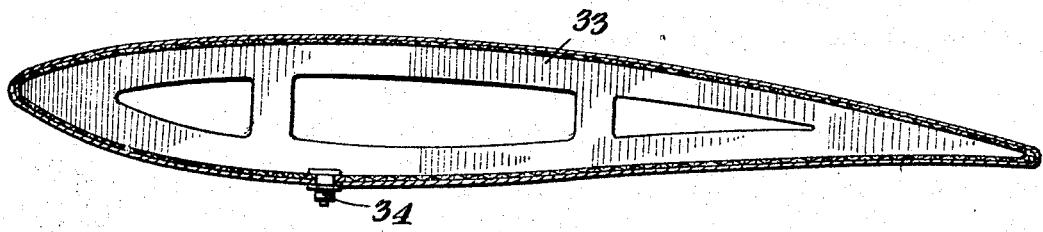
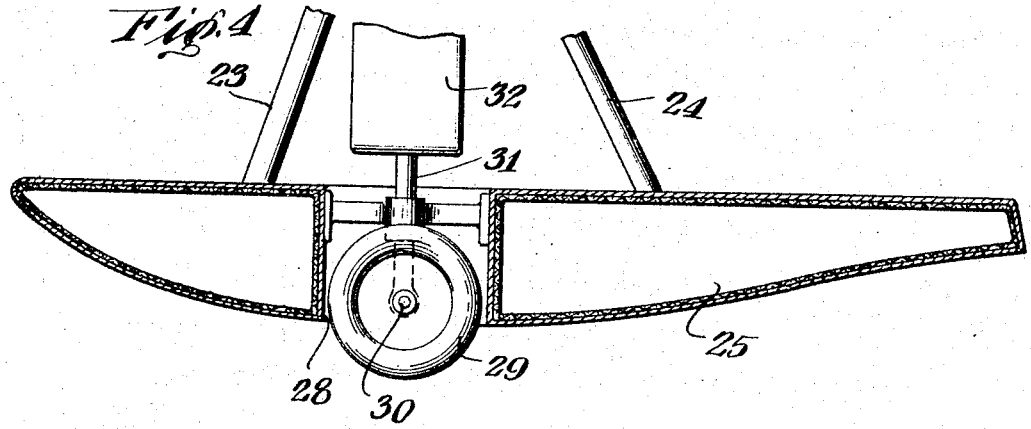
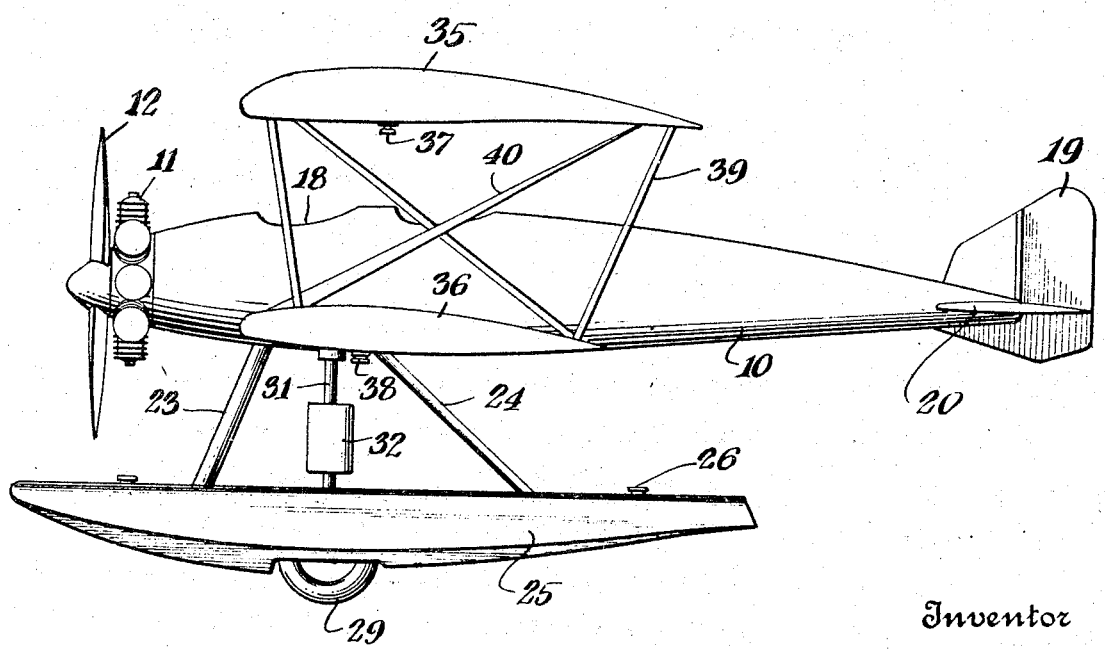

1,860,087

UNITED STATES PATENT OFFICE

ANTON FEHRENBACH, OF NEW YORK, N. Y.

SUPERLIGHT PLANE

Application filed January 17, 1931. Serial No. 509,521.

This invention relates to improvements in airplanes, particularly to a lighter than air plane, and it is the principal object of my invention to provide a duraluminum airplane equipped with wings and fuselage adapted to be filled with a gas as for instance helium gas to make the plane comparatively air buoyant in order to facilitate its starting, landing, and operation.

Another object of my invention is the provision of an airplane adapted for starting with equal facility from land or water and landing thereon.

Still another object of my invention is the provision of an airplane of the lighter than air type equipped with pontoons filled with gas having a median chamber for the reception of the landing gear.

A further object of my invention is the provision of an airplane of comparatively light weight and great air buoyancy, allowing the carrying of greater loads as usually carried by ships of its type particularly if for instance blue gas is used as motor fuel and which can make ready and safe landings and take-offs with less speed than ordinary airplanes.

A still further object of my invention is the provision of an aeroplane which can be readily maneuvered and is comparatively simple in its construction, yet durable and highly efficient in operation.

These and other objects and advantages of my invention will become more fully known as the description thereof proceeds and will then be specifically defined in the appended claims.

In the accompanying drawings forming a material part of this disclosure:

Fig. 1 is a side elevation of an aeroplane constructed according to my invention.

Fig. 2 is a fragmentary top plan view thereof.

Fig. 3 is a side elevation of a gas container in form of a wing.

Fig. 4 is a side elevation of the lower part of the airplane.

Fig. 5 is a side elevation of a modified form of my airship.

As illustrated the fuselage 10 of the airship is equipped with an engine 11 of any approved type operating the front propeller 12 and supplied with the necessary fuel from tanks 13, 14, through the valve controlled conduits 15, 16, the valve being designated 17.

The airship furthermore has the customary wind-shield protected cockpit 18, vertical rudder 19 and horizontal rudder 20 and wing or wings 21, equipped with the ailerons 22.

From the fuselage is suspended by means of the struts 23 and braces 24, a pontoon 25 adapted to be filled with a gas as for instance helium gas through nipple 26 and carrying a rear landing runner 27.

A chamber 28 is formed in the central portion of the pontoon in which is arranged the landing gear comprising a wheel or wheels 29 on shaft 30 suspended from the fuselage by means of the cushioned hangers 31, the cushioning means whereof are contained in a housing 32.

The fuselage carries gas containing wings 33 adapted to be filled with helium or other gas through nipple 34.

In the modified form of my airplane illustrated in Figure 5 a plurality of gas containing wings 35, 36, are provided to be filled with a gas through nipples 37, 38, and arranged in superposition on a frame composed of the struts 39 and braces 40.

The operation of my device will be entirely clear from the above description by simultaneous reference to the drawings, and it will be clear that the gas filling of the wings, if necessary of the fuselage and of the pontoons will confer to the plane a great air buoyancy making its operation convenient and safe.

It will be understood that I may make such changes in the construction of my airplane as come within the scope of the appended claims without departure from my invention.

Having thus described my invention what I claim as new and desire to secure by Letters Patent is:

1. An airplane comprising in combination with its fuselage adapted to be partly filled with a lighter than air gas, a plurality of gas containing wings, a plurality of gas containing pontoons, means for connecting said wings to the fuselage, means for suspending said pontoons from the fuselage, and a landing gear cushioned and passed through the pontoons.

2. A duraluminum airplane comprising a gas containing fuselage, a plurality of gas containing wings, means through which the gas is introduced into said wings, and fuselage, a plurality of ailerons provided on said wings, a pair of gas containing pontoons, each having a central chamber, cushioned hangers passed through said chambers and carrying landing wheels at their lower ends, and connected at their upper ends to the fuselage, and a housing for said cushioning means.

In witness whereof I have signed my name to this specification.

ANTON FEHRENBACH.